United States Patent
Lou et al.

(10) Patent No.: US 9,171,581 B2
(45) Date of Patent: Oct. 27, 2015

(54) FRICTION FORCE MEASUREMENT ASSEMBLY AND METHOD

(71) Applicant: Seagate Technology LLC, Cupertino, CA (US)

(72) Inventors: Huazhou Lou, Eden Prairie, MN (US); Lin Zhou, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 1 day.

(21) Appl. No.: 13/790,820

(22) Filed: Mar. 8, 2013

(65) Prior Publication Data

US 2014/0254341 A1    Sep. 11, 2014

(51) Int. Cl.
  *G11B 27/36* (2006.01)
  *G11B 5/455* (2006.01)
  *G11B 5/60* (2006.01)

(52) U.S. Cl.
  CPC ............ *G11B 27/36* (2013.01); *G11B 5/4555* (2013.01); *G11B 5/607* (2013.01); *G11B 5/6058* (2013.01); *G11B 5/6076* (2013.01)

(58) Field of Classification Search
  CPC ...... G11B 5/6005; G11B 5/455; G11B 21/21; G11B 2005/001; G11B 20/1816; G11B 2220/20; G11B 27/36; G11B 33/10; G11B 5/1278; G11B 5/3136; G11B 5/4846; G11B 5/4886; G11B 5/54; G11B 5/56
  USPC .................................................. 360/75, 110
  See application file for complete search history.

(56) References Cited

U.S. PATENT DOCUMENTS

| | | | |
|---|---|---|---|
| 5,235,512 A | | 8/1993 | Winkelman et al. |
| 5,594,595 A | * | 1/1997 | Zhu ................................. 360/31 |
| 5,859,357 A | | 1/1999 | Kameyama et al. |
| 6,018,431 A | * | 1/2000 | Carlson et al. .................. 360/60 |
| 6,196,062 B1 | | 3/2001 | Wright et al. |
| 6,351,341 B1 | * | 2/2002 | Lee et al. ......................... 360/75 |
| 7,079,339 B1 | * | 7/2006 | Semba et al. .................... 360/31 |
| 7,082,670 B2 | * | 8/2006 | Boismier et al. ........... 29/603.06 |
| 7,171,845 B2 | | 2/2007 | Mate et al. |
| 7,312,941 B2 | | 12/2007 | Hirano et al. |
| 7,349,170 B1 | * | 3/2008 | Rudman et al. ................. 360/75 |

(Continued)

FOREIGN PATENT DOCUMENTS

JP           63070149 A      3/1988

OTHER PUBLICATIONS

Burger et al., "Miniaturised Friction Force Measuring System for Tribological Research on Magnetic Storage Devices", 1996, pp. 99-104, IEEE.

*Primary Examiner* — Dionne Pendleton
(74) *Attorney, Agent, or Firm* — Westman, Champlin & Koehler, P.A.

(57) ABSTRACT

The application discloses a sensor device to measure friction force at a head-media interface. As disclosed, the sensor device has a transducer element oriented to provide an electrical output responsive to force or strain imparted to the transducer element along an in-plane axis. Sensor circuitry is coupled to the transducer element to process the electrical output to provide an output measure of friction force. In illustrated embodiments, the head includes an actuator element which is powered on/off at an on/off frequency to cyclically protrude a localized portion of the head. The on/off frequency of the actuator is used by the sensor circuitry to detect excitation of the sensor device due to friction force at the head-media interface.

5 Claims, 14 Drawing Sheets

(56) References Cited

U.S. PATENT DOCUMENTS

| | | |
|---|---|---|
| 2001/0008476 A1 | 7/2001 | Imamura |
| 2007/0127148 A1* | 6/2007 | Yokohata et al. ............... 360/31 |
| 2008/0273260 A1 | 11/2008 | Liu et al. |
| 2009/0262460 A1 | 10/2009 | Hanchi et al. |
| 2010/0002330 A1* | 1/2010 | Lille .............................. 360/59 |
| 2010/0079908 A1* | 4/2010 | Heidmann ................... 360/110 |
| 2010/0157454 A1* | 6/2010 | Chen et al. ..................... 360/30 |
| 2010/0157456 A1 | 6/2010 | Imamura et al. |
| 2011/0069410 A1* | 3/2011 | Kashiwase et al. ............. 360/75 |
| 2011/0211275 A1* | 9/2011 | Antoku et al. ................. 360/75 |
| 2011/0249363 A1* | 10/2011 | Kanaya et al. ................ 360/110 |
| 2014/0146649 A1* | 5/2014 | Bennin et al. .............. 369/53.38 |

* cited by examiner

FRICTION FORCE MEASUREMENT ASSEMBLY AND METHOD

BACKGROUND

Data storage devices position a head above a storage media to read data from and write data to the storage media. The spacing of the head from the media effects the strength of the read signal and the strength of the write signal. To achieve higher recording densities, the head is positioned closer to the media, which decreases the fly height of the head above the media. The decreased fly height increases the propensity of the head to contact the disc degrading read and write operations and increasing the propensity for damage to the head or media.

SUMMARY

The present application relates to a sensor device to measure friction force at a head-media interface for contact detection. The sensor device has a transducer element having a sensing axis orientated along an in-plane axis to provide an electrical output responsive to force or strain imparted to the transducer element of the sensor device along the in-plane axis. Sensor circuitry is coupled to the transducer element through contacts to provide an output measure of friction force. In illustrated embodiments, the head includes an actuator element which is powered on/off at an on/off frequency to cyclically protrude a localized portion of the head. The on/off frequency is used by the sensor circuitry to detect excitation of the sensor device due to friction force at the head-media interface. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
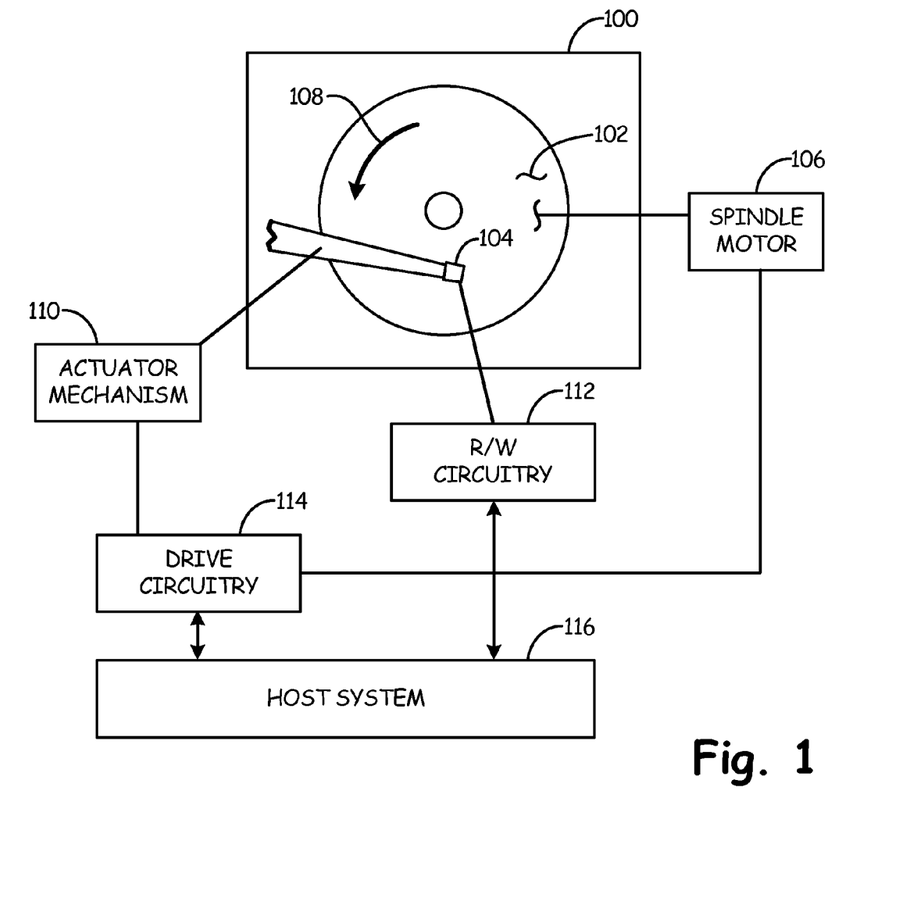
FIG. 1 is a schematic illustration of a data storage device including a data storage media and a head for reading data from and/or writing data to the data storage media.

The present application relates to a measurement apparatus or assembly for measuring friction force at a head-media interface which has application for a data storage device of the type illustrated in FIG. 1. The data storage device 100 shown in FIG. 1 includes a data storage media 102 to store digitally encoded data. A head 104 is positioned above the media 102 to read data from and/or write data to the data storage media 102. In the embodiment shown, the data storage media 102 is a rotating disc. For read and write operations, a spindle motor 106 (illustrated schematically) rotates the media 102 as illustrated by arrow 108 and an actuator mechanism 110 positions the head 104 relative to data tracks on the media 102. The head 104 includes one or more R/W transducer elements (not shown in FIG. 1). The one or more R/W transducer elements are electrically coupled to R/W circuitry 112 to encode data on the data storage media 102 and decode data from the data storage media 102. As shown, the spindle motor 106 and actuator mechanism 110 are operated through drive circuitry 114. Drive circuitry 114 and R/W circuitry 112 of the device 100 are coupled to a host system (not shown) for operation of the data storage device 100.

Figure 2:
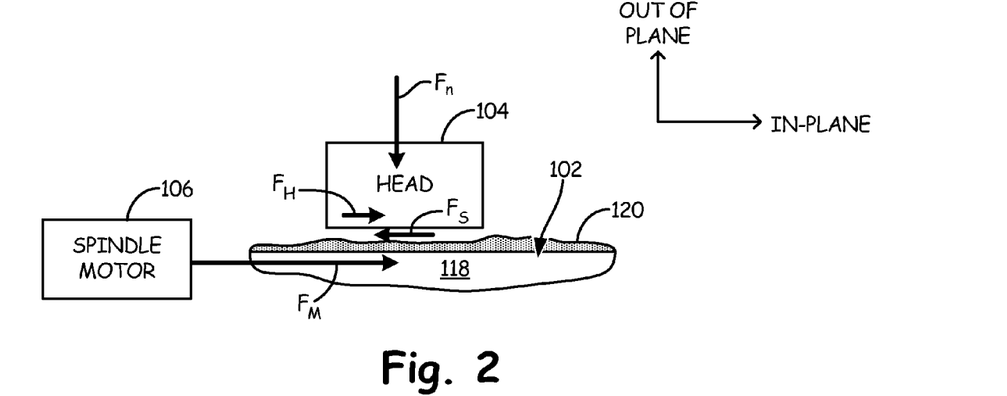
FIG. 2 is a schematic illustration of a head-media interface where the head is shown above the media.

As shown, in FIG. 2, the head 104 interfaces with the media 102 to read data from and/or write data to the media 102. The media 102 includes a magnetic layer 118 for storing magnetically encoded data. The media 102 can include a bit pattern to form a bit patterned media. Data can be stored on the media using perpendicular or parallel recording techniques as appreciated by those skilled in the art. As shown, a thin film lubricant layer 120 is formed on an outer surface of the media 102. For operation, a force $F_M$ is applied through the spindle motor 106 to rotate the media 102. As shown, the head 104 is biased toward the thin film lubricant layer 120 via a normal force $F_n$ such that prior to rotation, the lubricant layer 120 provides an adhesion or stiction force between the head 104 and the media 102. The adhesion between the head 104 and the media 102 imparts a static friction force $f_s$ which must be overcome to rotate the media 102. The static friction force $f_s$ is related to a coefficient of static friction $\mu$ between the head 104 and the media 102 and the bias force $F_n$ of the head $f_s = \mu F_n$. As illustrated by the equation 1, rotation of the media is proportional to the applied force $F_M$ minus the friction force $f_s$.

$$F_M - f_s = md\theta^2/dt^2 \qquad \text{Equation 1}$$

Figure 3:
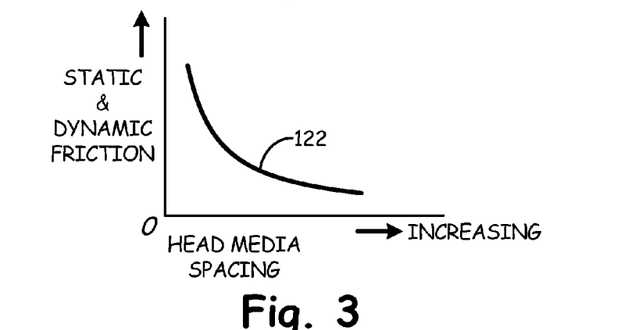
FIG. 3 graphically illustrates a relation between friction force and head-media spacing.

As shown in FIG. 2, a down-track pulling force $F_H$ is imparted to the head 104 in part via the $F_M$ via the friction or stiction between the head 104 and the moving media. The down-track force $F_H$ is in an in-plane direction relative to the media and $F_n$ is normal to $F_H$ in the out-of-plane direction. The force $F_H$ imparted to the head is proportional to a magnitude of the friction between head and the media and thus, a measure of $F_H$ imparted to the head provides a measure of the static and dynamic friction force between the head 104 and the media 102. The magnitude of the static and dynamic friction force decreases as the head-media spacing increases as graphically illustrated in FIG. 3.

Figure 4:
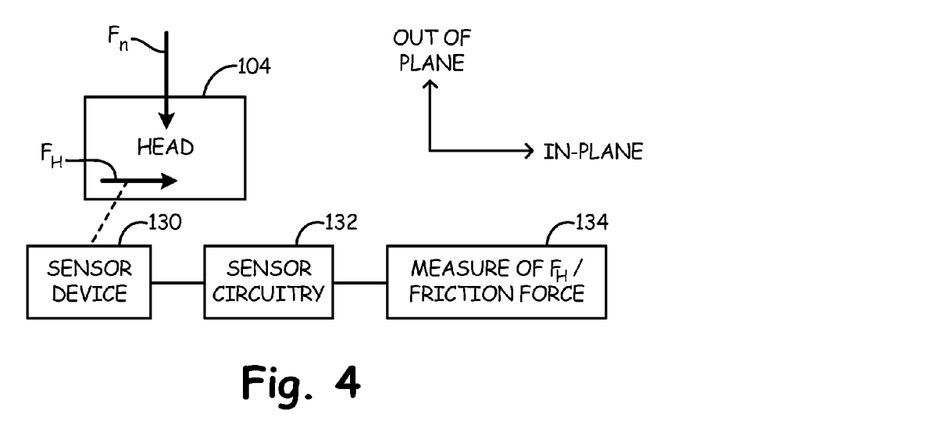
FIG. 4 schematically illustrates an embodiment of a head and sensor device to measure friction force.

FIG. 4 illustrates an embodiment of a measurement assembly of the present application. As shown in FIG. 4, the assembly includes a sensor device 130 and sensor circuitry 132 configured to provide a measure of $F_H$ or friction force 134 between the head 102 and the media 104. The sensor device 130 includes a piezoelectric or other transducer element that produces an output voltage or signal proportional to strain or force imparted to the sensor device 130. The sensor device 130 is coupled to the head so that the axial force $F_H$ or strain in the down-track direction is imparted to the sensor device 130 to produce an output voltage which is proportional to force $F_H$. The output voltage or signal from the sensor device 130 is processed by the sensor circuitry 132 to determine a measure of friction force 134 based upon a magnitude of force or strain in the in-plane direction imparted to the sensor device 130.

Figure 5:
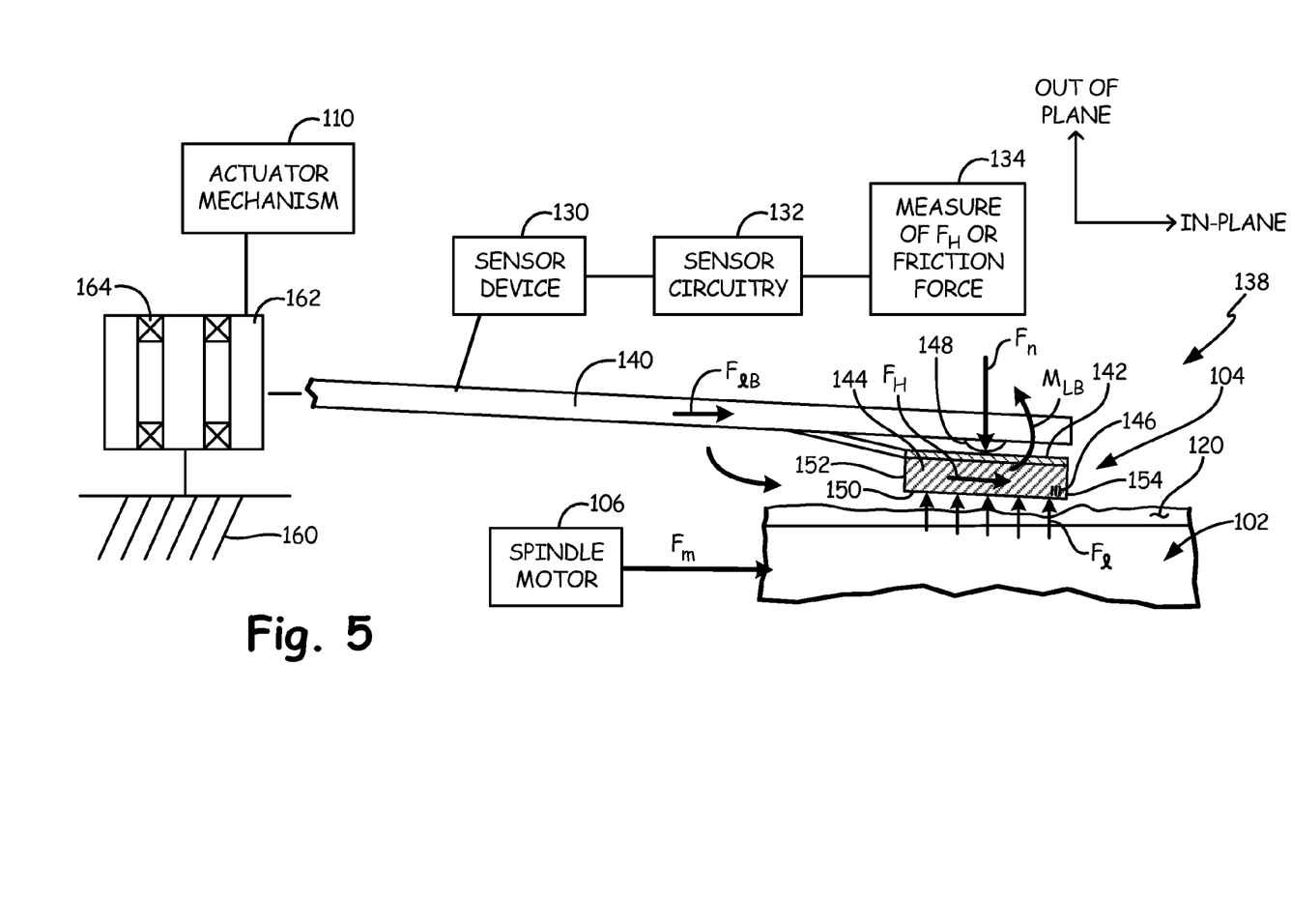
FIG. 5 schematically illustrates an embodiment of a sensor device on a load beam for measuring friction force.

FIG. 5 illustrates an embodiment of a head suspension assembly 138 for head 104 including the sensor device 130 for measuring friction force. The head suspension assembly includes a load beam 140. As shown, the head 104 is coupled to the load beam 140 through a gimbal spring 142. As schematically shown, the head 104 includes a slider 144 having one or more R/W transducer elements 146 (illustrated schematically) fabricated on the slider 144. Illustrative R/W transducer elements 146 include inductive write elements and magneto-resistive read elements or other R/W transducer element as known in the art. The load beam 140 applies the load force $F_n$ to the slider 144 through a load point or dimple 148 which defines a gimbal point about which the slider 144 pitches and rolls. As previously described for operation, force $F_M$ is supplied by the spindle motor 106 to rotate the media in direction 108 (shown in FIG. 1). Rotation of the media in direction 108 induces an air flow along an air bearing surface 150 of the slider 144 from a leading edge 152 to a trailing edge 154 of the slider 144. Air flow along the air bearing surface 150 of the slider 144 creates a pressure profile to provide an upward lifting force $F_l$ in the out-of-plane direction away from the media 102. The upward force $F_l$ is countered by force $F_n$ in the downward direction toward the media 102. The balance of the upward force and downward forces $F_l$ and $F_n$ defines a fly height of the head above the media or disc 102 for read and/or write operations.

As shown in FIG. 5, the load beam 140 is rotationally coupled to a frame or deck 160 (schematically shown) of the data storage device through an actuator block 162. Actuator block 162 is rotationally coupled to the base or deck 160 through a bearing assembly 164 (illustrated schematically). Actuator mechanism 110 rotates the actuator block 162 to move the head through the load beam 140 relative to selected data tracks on the storage media 102. In the embodiment illustrated in FIG. 5, the assembly includes the sensor device 130 on the load beam 140 to measure force $F_H$ imparted to the head at the head-media interface. The $F_H$ imparts a force and/or moment $F_{LB}$ or $M_{LB}$ to the load beam 140 through the gimbal point 148. As shown, the sensor device is coupled to the load beam 140 at a distance spaced from the gimbal point 148 so that the force or strain imparted to the sensor device 130 is increased due to the distance of the sensor device 130 from the application point of the force. The sensor device 130 is coupled to sensor circuitry 132 to process the output voltage from the sensor device 130 to provide the measure of friction force 134 at the head-media interface as previously described.

Figure 6A:
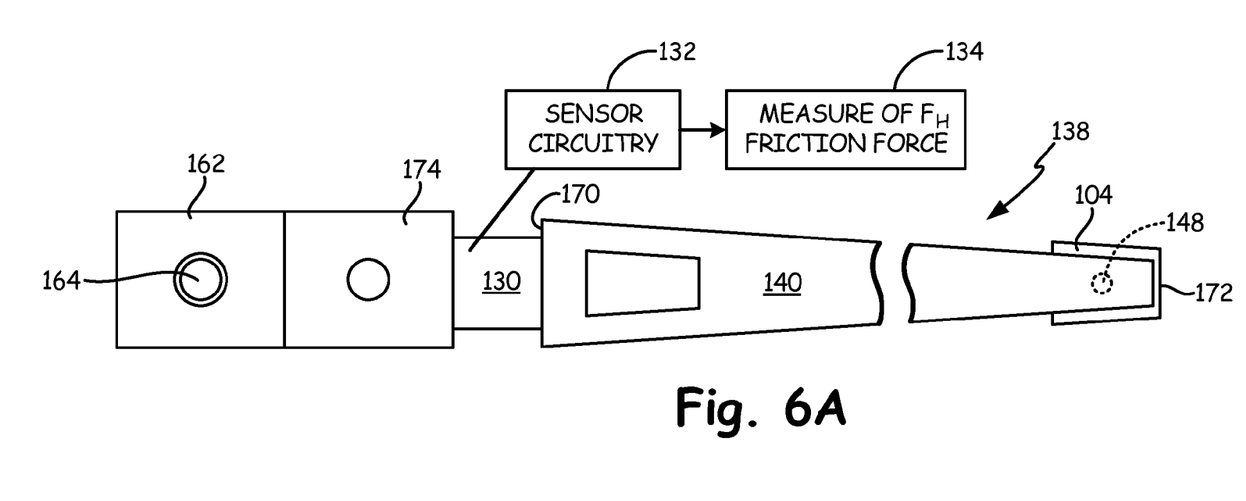
FIGS. 6A-6B illustrate an embodiment of a head suspension assembly including a sensor device coupled to the load beam.
Figure 6B:
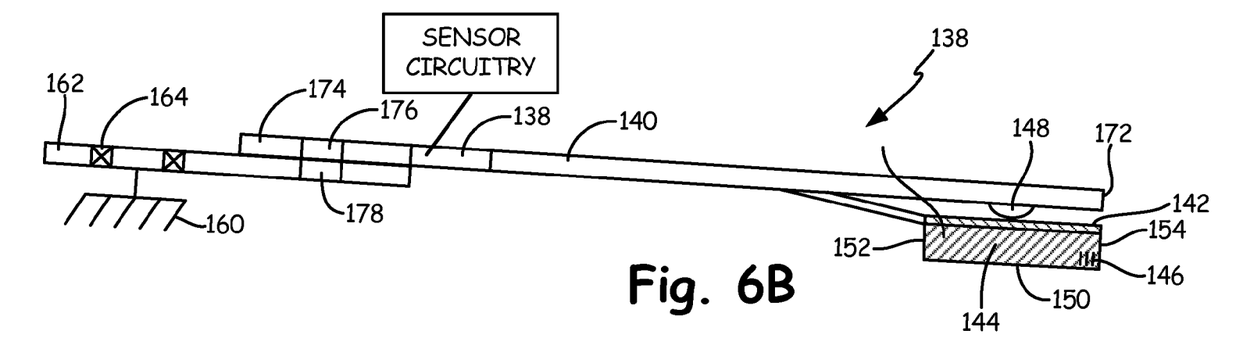

FIGS. 6A-6B illustrates an embodiment of the head suspension assembly 138 including the sensor device 130 for measuring static and dynamic friction force as previously described. As shown, the load beam 140 has an elongate length that extends between a proximal end 170 and a distal end 172 of the load beam 140. The proximal end 170 of the load beam 140 is swaged to the actuator block 162 through a swage plate 174 and the head 104 is coupled to a distal end 172 of the load beam 140 through the gimbal spring 142 as previously described. As is known in the art a swaging tool (not shown) is used to connect the swage plate 174 to the rotating actuator body 162 through a material deformation. The swaging tool is inserted through openings 176, 178 (shown in FIG. 6B) of the swage plate 174 and actuator block 162 to connect the load beam 140 to the actuator block 162. In the embodiment shown, the sensor device 130 is disposed between the swage plate 174 and the proximal end 170 of the load beam 140 in a load path between load beam and the stationary or fixed portion 160 of the assembly. As previously described, force $F_H$ from the head 104 is imparted to the load beam 140 and strains or imparts an axial force to the sensor device 130 proportional to the friction force at the head-media interface. The sensor circuitry 132 receives output from the sensor device 130 to provide the measure of friction force at the head-media interface.

Figure 7A:
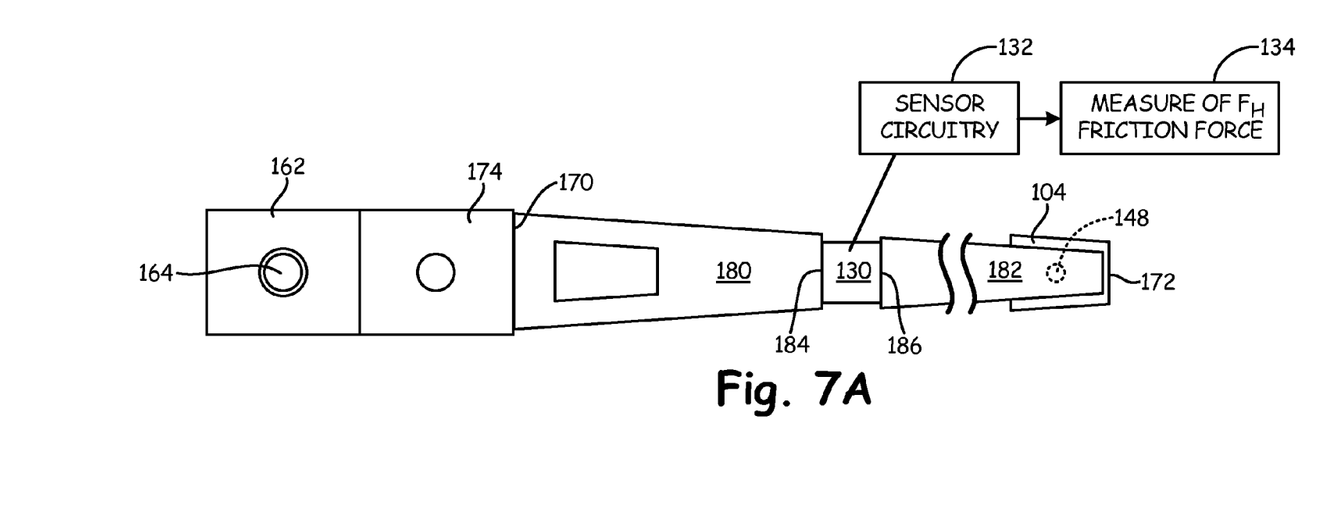
FIGS. 7A-7B illustrate another embodiment of a head suspension assembly including a sensor device coupled between a proximal portion and a distal portion of the load beam.
Figure 7B:
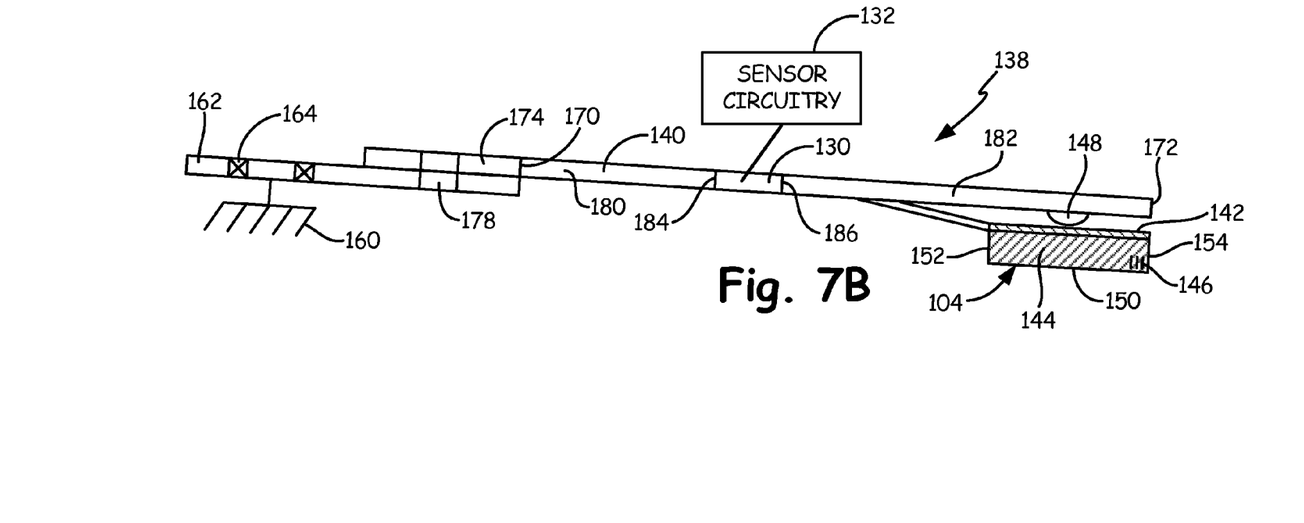

FIGS. 7A-7B illustrate another embodiment of a measurement apparatus including a sensor device 130 disposed along the length of the load beam 140 spaced from the head 104 and gimbal spring 142 as previously illustrated in FIGS. 6A-6B. As shown in FIGS. 7A-7B, the sensor device 130 is located between the proximal and distal ends of the load beam 140 and separates a proximal segment 180 of the load beam 140 from a distal segment 182 of the load beam. The proximal segment 180 extends from the swage plate 174 to a proximal end 184 of the sensor device 130 and the distal segment 182 of the load beam 140 extends from the distal end 186 of the sensor device 130 to the distal end 172 of the load beam 140. Thus, in the illustrated embodiment, the sensor device 130 is located along the load beam spaced from the gimbal point 148 of the head assembly. As previously described, the sensor device 130 includes a transducer element that provides a voltage signal or input responsive to force or strain to measure static and dynamic friction force.

Figure 8A:
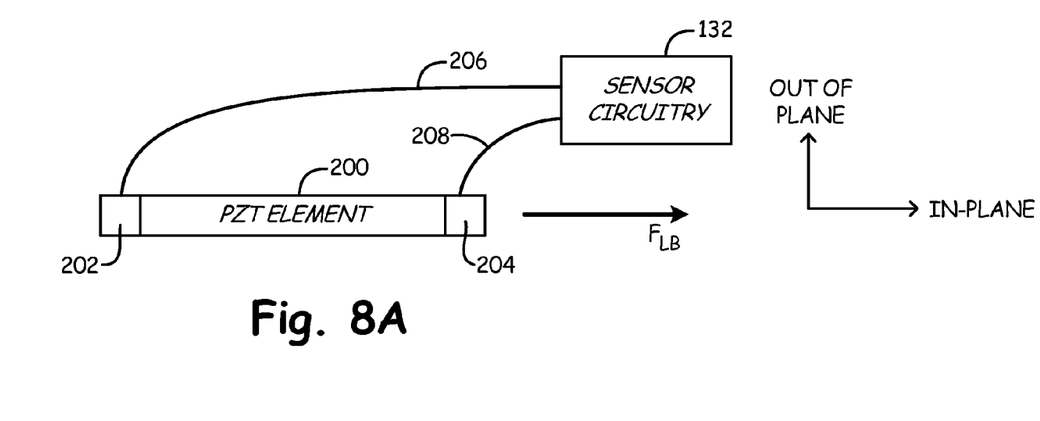
FIGS. 8A-8B illustrate embodiments of the sensor device for detecting in-plane force or strain to measure friction force.
Figure 8B:
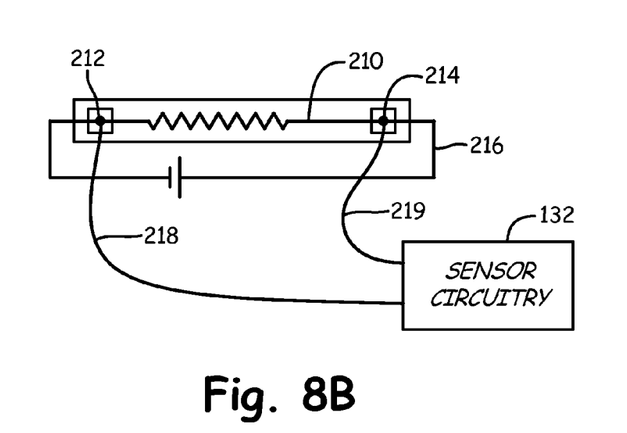

The sensor device 130 illustrated in the previous FIGS. can use different transducer elements to provide an output voltage or signal proportional to an input force or strain. FIGS. 8A-8B illustrate alternate sensor devices utilizing different transducer elements to provide an electrical output responsive to an input force or strain. In an embodiment shown in FIG. 8A, the sensor device 130 includes a piezoelectric element or material 200. As shown, the piezoelectric element 200 has a length extending along the in-plane axis between axially spaced electrodes 202, 204. The length of the transducer element 200 extending between electrodes 202, 204 forms a sensing axis coextending along the in-plane axis to detect force or strain along the in-plane axis. As shown, the electrodes 202, 204 are electrically connected to the sensor circuitry 132 via leads 186, 188 to provide the input voltage signal responsive to force or strain along the in-plane axis. The piezoelectric transducer element 200 shown provides a passive sensing element that does not require a bias voltage or current for measurement.

In another embodiment illustrated in FIG. 7B, the sensor device 130 employs are resistive transducer element 210 (illustrated diagrammatically). Sensor circuitry 132 is connected to contact pads 212, 214 to detect a change in resistance across the resistive element 210. The resistive element 210 has an elongate length orientated to provide a sensing axis to detect strain or force in the in-plane direction as previously described. As shown, a bias current or voltage 216 is applied across the resistive element 210 and the resistance across the contact pads 212, 214 is measured via sensor circuitry 132 connected to contact pads 212, 214 via leads 218, 219. The measured resistance or strain is used by the sensor circuitry 132 to output the measure of friction force 134 as previously described.

Figure 9:
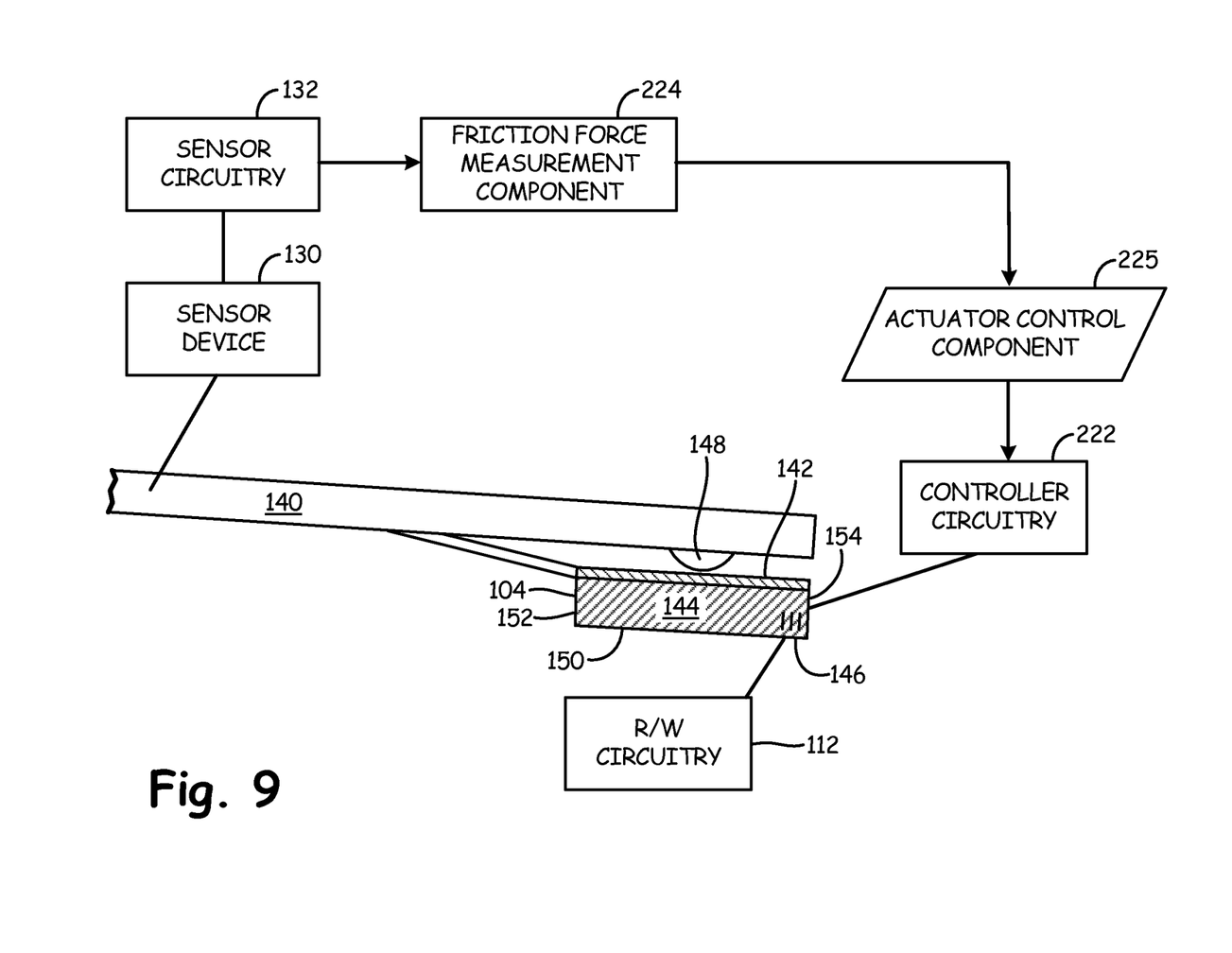
FIG. 9 illustrates a head having an actuator or heater element for protruding a localized portion of the head and a sensor device for detecting in-plane force to output a measure of friction force at a head-media interface.

As shown in FIG. 9, the head 104 includes the one or more transducer elements 146 connected to the R/W circuitry 112 and an actuator element 220 proximate to the trailing edge of the slider. The actuator element 220 is energized to protrude a localized portion of the head and transducer elements 146 toward the media under control of the controller 222. In the illustrated embodiment, the actuator element 220 is a resistive heater element operated or powered by controller 222 to protrude the localized portion of the head 104. As shown the assembly includes measurement component 224 for implementing measurement algorithms or procedures to measure friction force. The measurement component 224 provides actuator control parameters 225 to operate the actuator or heater 220 to protrude the localized portion of the head 104. The measurement component 224 utilizes output from the sensor circuitry 132 to provide the output measure of friction force which is stored in memory and/or used by the data storage device. The algorithm or procedure implemented by the measurement component 224 can be implemented using instructions stored in memory including non-volatile memory such as FLASH, EPROMM or through digital or analog circuit components. Although a resistive heating element is shown, application is not limited to a heating element and other actuator elements such as a piezoelectric actuator element can be employed to protrude the localized portion of the head as described herein.

Figure 10A:
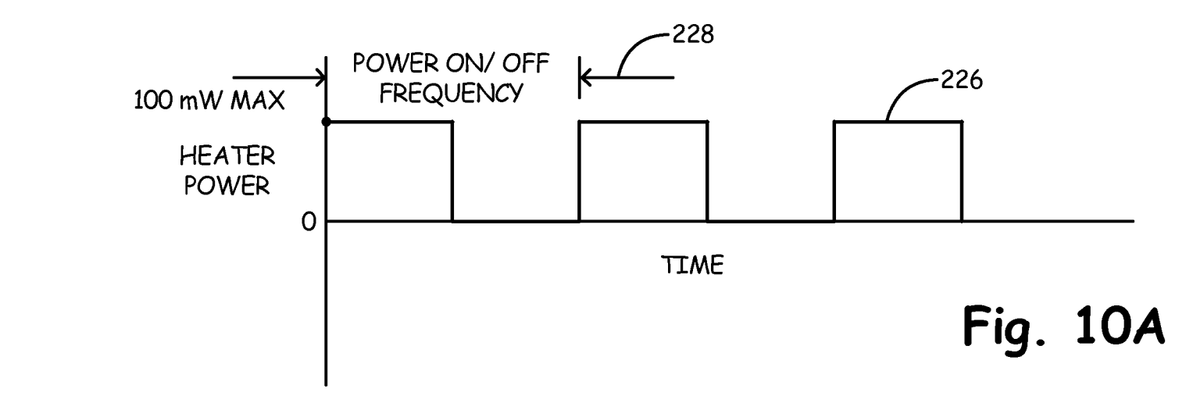
FIG. 10A illustrates a power input having a power on/off frequency to energize an actuator or heater to protrude the head towards the media and FIG. 10B illustrates output from the sensor device corresponding to the power on/off frequency of the actuator or heater.
Figure 10B:
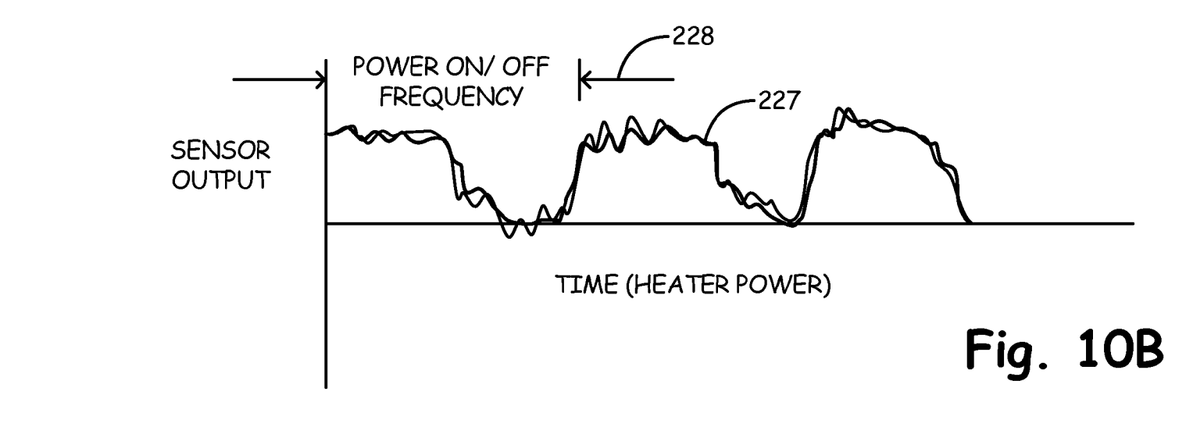

FIG. 10A illustrates A power input 226 for operating the actuator or heater 220 and corresponding deformation or excitation 227 of the sensor device 130 as shown in FIG. 10B. As shown in FIG. 10A, the power input 226 includes a power on/off cycle or frequency 228 with respect to time. The power is cycled "on" to a maximum power amplitude and cycled "off" to near zero. As cooperatively illustrated in FIGS. 10A-10B, at low power levels (power <100 mW) prior to contact, sensor output 227 or friction force is zero or nearly zero. As the power increases (above 100 mW) and the head nears contact or contacts the media 104, the measure of static and dynamic friction and sensor output 227 increases as shown.

Figure 10C:
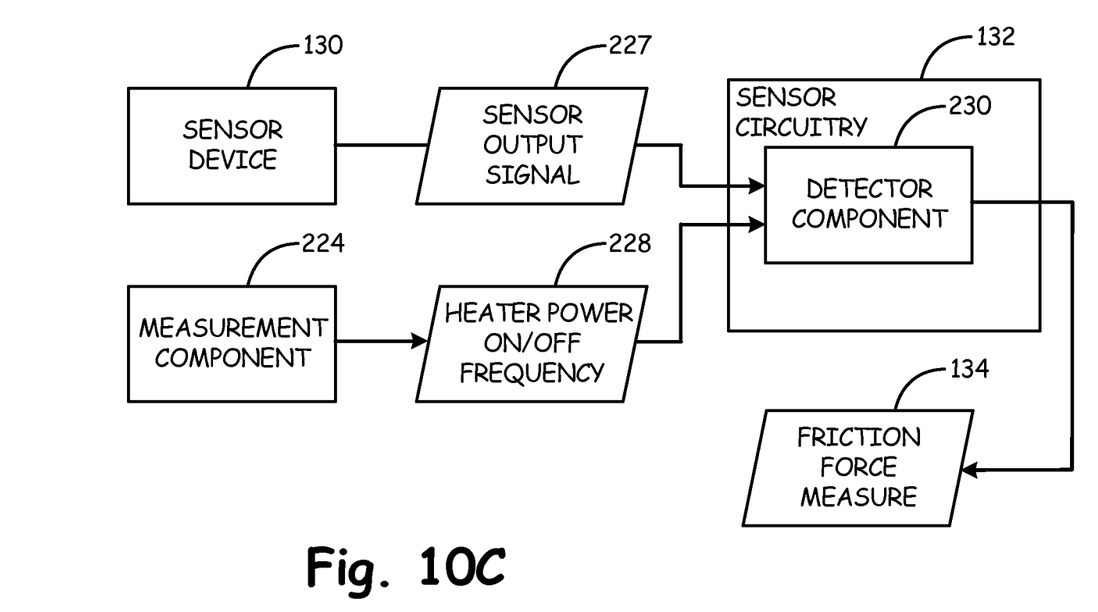
FIG. 10C schematically illustrates an embodiment of sensor circuitry coupled to the sensor device to output a measure of friction force.

As shown in FIG. 10C, the power on/off frequency 228 provides a reference frequency that is used to extract excitation of the sensor device 130 corresponding to friction force or $F_H$ at the head-media interface. In particular, the frequency of excitation of the sensor device 130 as a result of the friction force corresponds to the power on/off frequency 228 and thus output from the sensor device 130 which results from friction force can be isolated from noise or other excitation or forces using the power on/off frequency 228. The on/off cycle or frequency 228 of the actuator element or heater 220 also reduces signal drift. A low power on/off frequency 228 is used so that the excitation frequency of the sensor device 130 corresponding to friction mode is lower than the frequency of vibration modes of the head and suspension assembly and other high frequency noise.

FIG. 10C illustrates an embodiment of the sensor circuitry 132 that processes the output sensor signal 227 to provide the output friction measurement 134. As shown in FIG. 10C, the sensor circuitry 132 includes a detector component 230 which receives the output sensor signal 227 and power reference signal or frequency 228 and uses the reference frequency 228 to extract the friction force component from the sensor output 227. In the illustrated embodiment, the detector component 230 is a lock in amplifier detector which uses the reference signal to extract the friction component from the output signal 227. The power on/off frequency 228 is selected so that frequency is lower than the frequency associated with actuator or heater time constraints so that the actuator or heater 220 can reach a fully actuated state during the actuator or heater "on" period. Additionally the power on/off frequency 228 is different from resonance frequencies of components of the device, such as resonance modes of the spindle motor or suspension assembly to provide a distinct frequency response for the measure of static or dynamic friction.

Figure 11A:
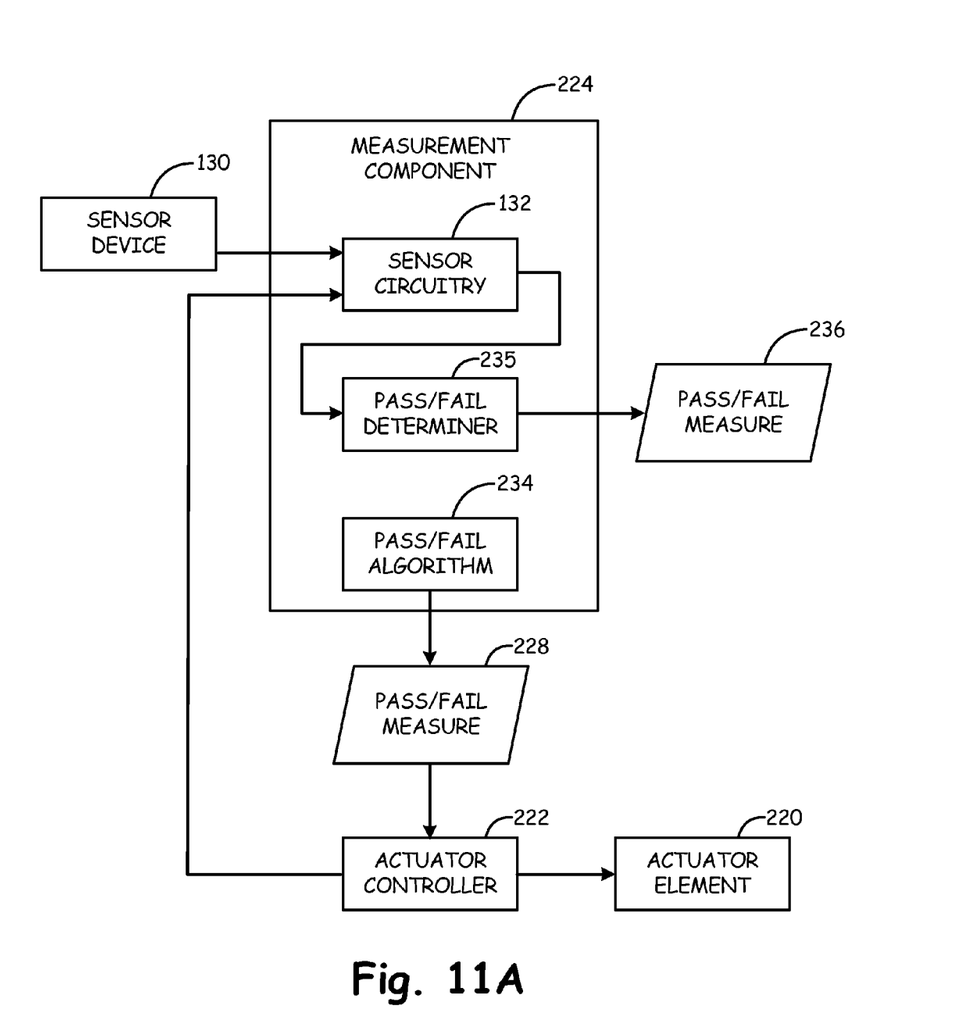
FIGS. 11A-11B illustrate an embodiment of a measurement component configured to measure friction force and output a pass/fail determination utilizing the measure of friction force.
Figure 11B:
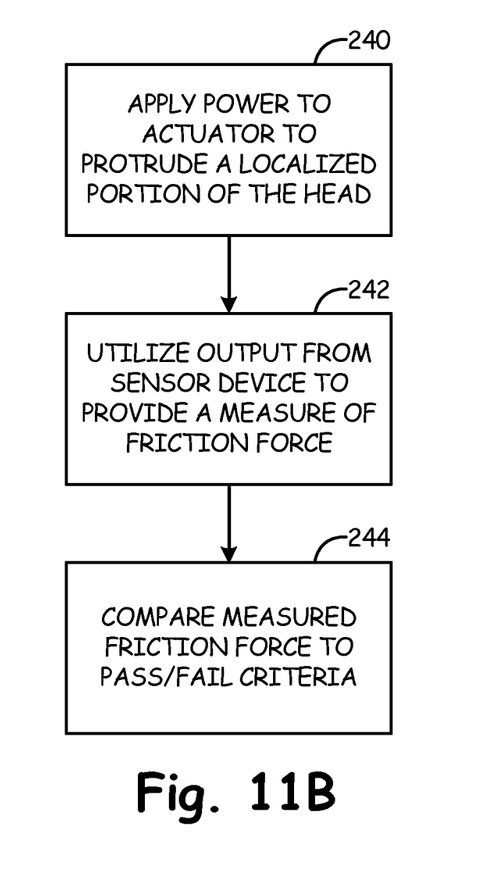

FIGS. 11A-11B illustrate application of the sensor device 130 to determine a pass/fail measure for a device or drive 100. In the embodiment shown in FIG. 11A, the measurement component 224 is configured to implement a pass/fail algorithm 234. The pass/fail algorithm 234 operates the actuator 220 to protrude the localized portion of the head 104 at the power on/off frequency 228 to measure friction force using the sensor device 130. As shown, the measurement component 224 also includes a pass/fail determiner 235. Output or measurement from the sensor device 130 is provided to the pass/fail determiner 235. The pass/fail determiner 235 uses the measured friction force to determine whether the drive or device 100 meets quality standards and provides an output pass/fail measure 236. As shown in FIG. 11B, the pass/fail algorithm 234 applies power to the actuator or heater 220 to protrude a trailing edge portion of the slider 144 towards the media as shown in step 240. In step 242, output from the sensor device 130 is processed to provide the measure of friction force. As shown, in step 244, the measured friction force is compared to a pass/fail criteria to output the pass/fail measure 236. As described, the pass/fail algorithm 234 uses the measured friction force and the pass/fail criteria to output the pass/fail measure 236 for quality control testing.

Figure 12A:
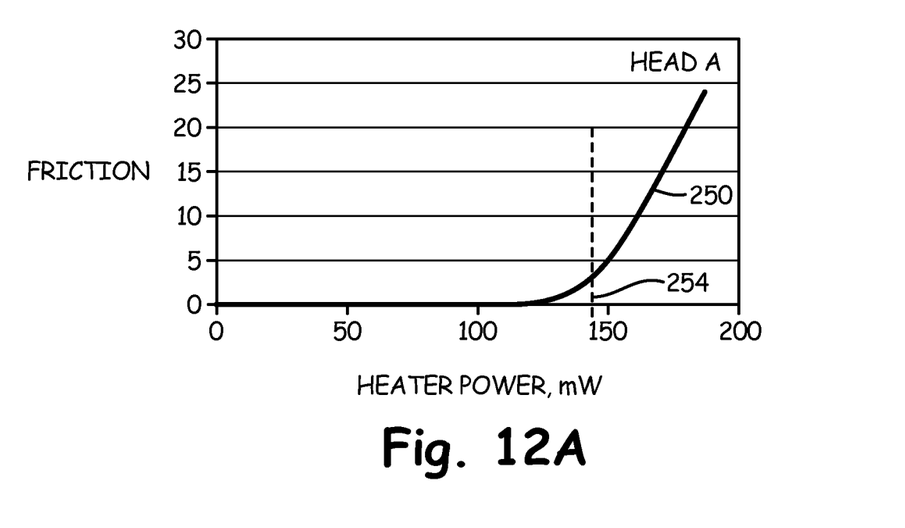
FIGS. 12A-12B graphically illustrate a relation between friction force and heater power for a head A and a head B, respectively.
Figure 12B:
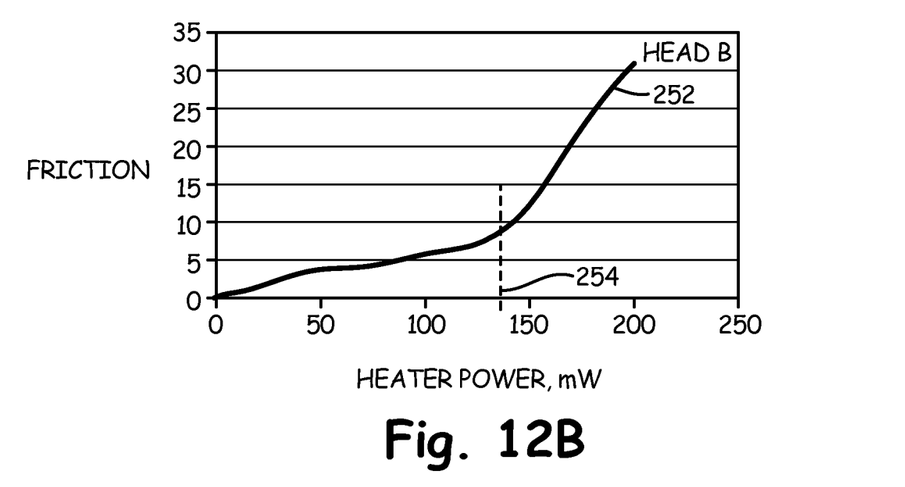

FIGS. 12A-12B graphically illustrate measured friction force 250, 252 v heater power for a head A and a head B, respectively. As shown in FIG. 12A, at or above a threshold power level 254, the head contacts the media 102. Thus, below the threshold level 254 the head is above or spaced from the media and thus, the friction force is at or near zero. Determining the head media contact vertical actuation power for actuator element 220 is critical for the data storage device to set correct head-media spacing for reliably operating the head. In contrast in FIG. 12B, head B is unstable such that below the threshold level 254 there is a measure of friction force indicating intermittent head-media contact. As shown, output friction force from the sensor device 130 is used by determiner 235 illustrated in FIG. 11A to detect defective heads or component for quality control. Based upon the measured friction force for head A in FIG. 12A, the determiner 235 would output a pass measure, and in an illustrated embodiment, the controller circuitry 222 will operate the actuator element 220 with the correct actuation power based on the contact threshold power level 254, while for head B in FIG. 12B the determiner 235 would output a fail measure since the fly height for head B is unstable at low power levels below the head-media contact threshold 254.

Figure 13A:
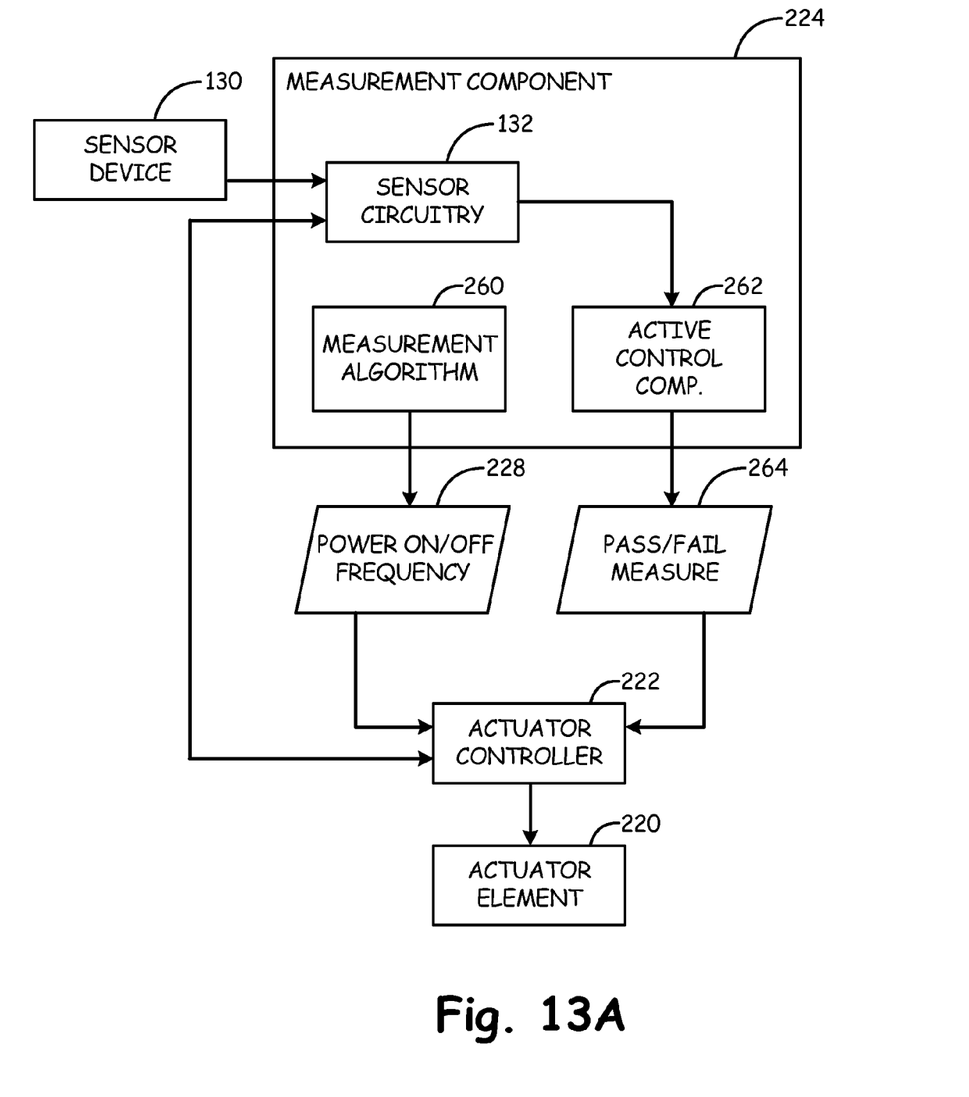
FIGS. 13A-13B illustrate an embodiment of a measurement component configured to implement a measurement process or procedure to measure friction force and output head-media spacing control parameters for controlling operation of an actuator or heater element.
Figure 13B:
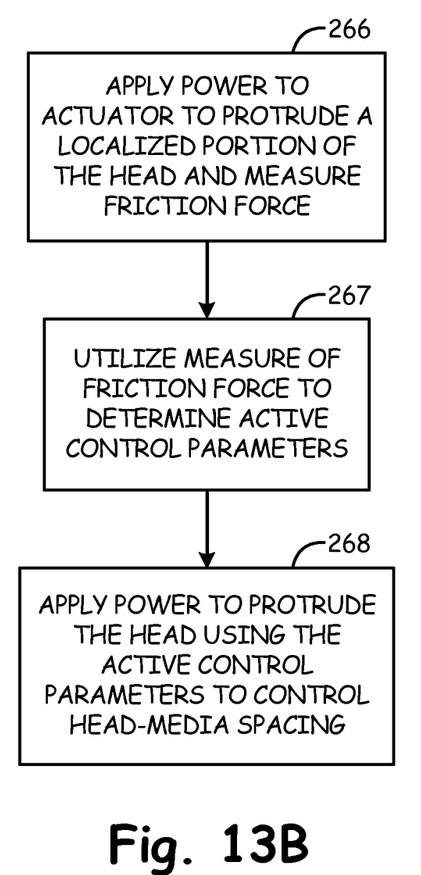

FIGS. 13A-13B illustrate an embodiment for providing active head-media spacing control utilizing the output measure of friction force 134. As shown, in the illustrated embodiment of FIG. 13A, the measurement component 224 includes an algorithm 260 to power on/off the actuator or heater 220 to protrude the localized portion of the head 104 to measure friction force and an active control component 262 to provide head-media spacing control parameters 264 to operate the actuator or heater 220 to provide a desired fly height for read and write operations. As illustrated in FIG. 13B, the algorithm 260 applies power at the power on/off frequency 228 as illustrated in step 266 to measure friction force. In step 267 the active control component 262 uses the output measure of friction force to determine active control parameters 264 to power the actuator 220 a proper amount to provide desired head-media spacing. In step 268, the controller uses the active control parameters 264 to apply the power to the actuator 220 to protrude the head to optimize head-media spacing during read and write operations.

Although various uses of the measurement assembly are disclosed in the application, embodiments are not limited to a particular application or use disclosed in the application. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the system while maintaining substantially the same functionality without departing from the scope and spirit of the present invention. In addition, although the preferred embodiment described herein is directed to a particular data storage system, it will be appreciated by those skilled in the art that the teachings of the present invention can be applied to other data storage device, such as optical devices, without departing from the scope and spirit of the present invention.

What is claimed is:

1. An assembly comprising:
   a load beam having an elongate length extending along an in-plane axis;
   a head coupled to the load beam through a gimbal spring to supply a load force to the head along an out-of-plane axis generally transverse to the in-plane axis; and
   a sensor device coupled to the load beam including a transducer element having a sensing axis orientated along the in-plane axis of the load beam to provide an electrical output responsive to force or strain imparted to the transducer element along the in-plane axis, wherein the load beam includes a proximal portion and a distal portion coupled to the head through the gimbal spring and the sensor device is connected to the load beam between the proximal and distal portions of the load beam; and
   sensor circuitry coupled to the sensor device through contacts coupled to the transducer element to process the electrical output responsive to the force or strain imparted to the transducer element to provide an output measure of friction force parallel to the load beam,
   wherein the sensor circuitry includes a detector component configured to utilize a reference signal to extract the measure of friction force from the electrical output from the sensor device, and
   wherein the detector component is a lock-in amplifier detector.

2. The assembly of claim 1 wherein the transducer element is a piezoelectric transducer element and comprising a first electrode coupled to a first end of the piezoelectric transducer element and a second electrode coupled to a second end of the piezoelectric transducer element axially spaced from the first electrode along the in-plane axis.

3. The assembly of claim 2 comprising sensor circuitry is coupled to the piezoelectric transducer element through leads coupled to the first and second electrodes and configured to utilize the electrical output from the piezoelectric transducer element to output a measure of friction force.

4. The assembly of claim 1 wherein the sensor device is a strain gauge and the transducer element comprises a resistive element having an elongate length orientated along the in-plane axis and contact pads coupled to spaced ends of the resistive element.

5. The assembly of claim 4 wherein the sensor circuitry is coupled to the resistive element through leads coupled to the contact pads.

* * * * *